UNITED STATES PATENT OFFICE.

JOSEPH FLACHSLAENDER, KARL PAUL GRÄLERT, AND MAX BUFF, OF ELBERFELD, GERMANY, ASSIGNORS TO SYNTHETIC PATENTS CO., INC., OF NEW YORK, N. Y., A CORPORATION OF NEW YORK.

SULFUR COLORS.

1,132,922.   Specification of Letters Patent.   Patented Mar. 23, 1915.

No Drawing.   Application filed September 16, 1913.   Serial No. 789,997.

*To all whom it may concern:*

Be it known that we, JOSEPH FLACHSLAENDER, KARL PAUL GRÄLERT, and MAX BUFF, doctors of philosophy, chemists, citizens of the German Empire, residing at Elberfeld, Germany, have invented new and useful Improvements in New Sulfur Colors, of which the following is a specification.

Our invention relates to the manufacture and production of new and valuable brown sulfur colors which are obtained by treating with alkali polysulfids perimidin compounds of the constitution graphically represented

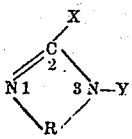

where X and Y include hydrogen, alkyl, aralkyl and aryl groups, and R stands for a naphthalene nucleus, such as perimidin, perimidin-6- or 5.8-disulfonic acid, N(3)-methylperimidin, (Y=CH$_3$), (2)methyl- or (2)phenylperimidin, (X= —CH$_3$ or —C$_6$H$_5$), (2.3)dimethylperimidin (X and Y=CH$_3$). The reaction can also be carried out with the addition of copper or a copper compound.

The new dyes are after being dried and pulverized dark powders soluble in a solution of sodium sulfid generally with a brownish to red-brown coloration and soluble in concentrated sulfuric acid with a brownish coloration. They dye cotton generally brown shades distinguished by their fastness to light and to boiling.

In order to illustrate the new process more fully the following example is given, the parts being by weight:—180 parts of crystallized sodium sulfid, 50 parts of sulfur, 10 parts of copper powder, 20 parts of perimidin having most probably the following formula:

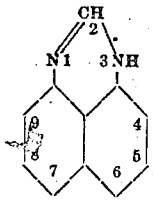

are heated until dry, the temperature being gradually raised and the heating is then continued for 6 to 8 hours at from 200–250° C. The melt is powdered and then ready for use. The dyestuff is a dark powder soluble in a sodium sulfid solution with a reddish-brown coloration. It is soluble in concentrated sulfuric acid with a brownish coloration and dyes cotton in pure and brilliant generally brown shades fast to light and to boiling.

The above mentioned quantities of sodium sulfid and of sulfur as well as the temperature and the duration of the reaction can be varied within wide limits.

We claim:—

1. The new sulfur dyes being sulfur containing derivatives of perimidin compounds containing the nucleus graphically represented:

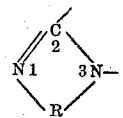

where R stands for a naphthalene nucleus, which dyes are after being dried and pulverized dark powders being soluble in a solution of sodium sulfid generally with a brownish to red-brown coloration; being soluble in concentrated sulfuric acid with a brownish coloration; and dyeing unmordanted cotton generally brown shades fast to light and to boiling, substantially as described.

2. The new sulfur dyes being sulfur containing derivatives of perimidin compounds containing the nucleus graphically represented:

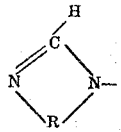

where R stands for a naphthalene nucleus which dyes are after being dried and pulverized dark powders being soluble in a solution of sodium sulfid generally with a brownish to red-brown coloration; being soluble in concentrated sulfuric acid with a brownish coloration; and dyeing unmordanted cotton generally brown shades fast to light and to boiling, substantially as described.

3. The new sulfur dyes being sulfur containing derivatives of perimidin compounds containing the nucleus graphically represented:

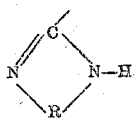

where R stands for a naphthalene nucleus which dyes are after being dried and pulverized dark powders being soluble in a solution of sodium sulfid generally with a brownish to red-brown coloration; being soluble in concentrated sulfuric acid with a brownish coloration; and dyeing unmordanted cotton generally brown shades fast to light and to boiling, substantially as described.

4. The new sulfur dye being sulfur containing derivatives of perimidin having most probably the formula:

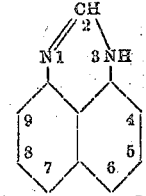

which is after being dried and pulverized a dark powder soluble in a sodium sulfid solution with a reddish-brown coloration and soluble in concentrated sulfuric acid with a brownish coloration; and dyeing unmordanted cotton in pure and brilliant generally brown shades fast to light and to boiling, substantially as described.

In testimony whereof we have hereunto set our hands in the presence of two subscribing witnesses.

JOSEPH FLACHSLAENDER. [L. S.]
KARL PAUL GRÄLERT. [L. S.]
MAX BUFF. [L. S.]

Witnesses:
ALBERT NUFER,
HELEN NUFER.